United States Patent
Wang et al.

(10) Patent No.: US 11,720,665 B2
(45) Date of Patent: Aug. 8, 2023

(54) IMPROVING DATA INTEGRITY WITH TRUSTED CODE ATTESTATION TOKENS

(71) Applicant: Google LLC, Mountain View, CA (US)

(72) Inventors: Gang Wang, Jersey City, NJ (US); Alex Daniel Jacobson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 439 days.

(21) Appl. No.: 17/053,287

(22) PCT Filed: Apr. 23, 2020

(86) PCT No.: PCT/US2020/029467
§ 371 (c)(1),
(2) Date: Nov. 5, 2020

(87) PCT Pub. No.: WO2021/029919
PCT Pub. Date: Feb. 18, 2021

(65) Prior Publication Data
US 2023/0050546 A1    Feb. 16, 2023

Related U.S. Application Data

(60) Provisional application No. 62/885,972, filed on Aug. 13, 2019.

(51) Int. Cl.
*G06F 21/52* (2013.01)
*G06F 21/64* (2013.01)
*H04L 9/32* (2006.01)

(52) U.S. Cl.
CPC ............. *G06F 21/52* (2013.01); *G06F 21/64* (2013.01); *H04L 9/3213* (2013.01)

(58) Field of Classification Search
CPC ......... G06F 21/52; G06F 21/64; H04L 9/3213
(Continued)

(56) References Cited

U.S. PATENT DOCUMENTS

2005/0278253 A1 * 12/2005 Meek ................... G06F 21/31
 705/50
2006/0265493 A1 * 11/2006 Brindley ............... G06Q 30/02
 709/224

(Continued)

FOREIGN PATENT DOCUMENTS

| CN | 103605697 | 2/2014 |
|---|---|---|
| JP | 20065921 | 1/2006 |
| KR | 1020090107329 | 10/2009 |

OTHER PUBLICATIONS

Dong et al., "FraudDroid: Automated Ad Fraud Detection for Android Apps", Association for Computing Machinery, 2018 (Year: 2018).*

(Continued)

*Primary Examiner* — Thanh T Le
(74) *Attorney, Agent, or Firm* — Fish & Richardson P.C.

(57) ABSTRACT

Methods, systems, and computer readable medium for verifying interactions with digital components. The method includes receiving input indicating interaction associated with a digital component that is provided by a content provider and presented by a user interface of the user device, determining, by a trusted program of the user device, that the interaction is valid, generating, by the trusted program and based on the determination that the interaction is valid based on a validity evaluation, a digitally signed token that attests the validity of the interaction with the digital component, and providing, by the trusted program and to a third party, the digitally signed token as an indication of the validity of the interaction.

20 Claims, 4 Drawing Sheets

(58) Field of Classification Search
USPC .......................................................... 726/22
See application file for complete search history.

(56) References Cited

U.S. PATENT DOCUMENTS

| | | | | |
|---|---|---|---|---|
| 2008/0052629 | A1* | 2/2008 | Phillips | G06Q 30/02 |
| | | | | 705/318 |
| 2011/0113388 | A1* | 5/2011 | Eisen | G06F 21/554 |
| | | | | 715/856 |
| 2017/0032412 | A1* | 2/2017 | Scharber | G06F 16/24573 |
| 2017/0308681 | A1* | 10/2017 | Gould | G06Q 30/0248 |

OTHER PUBLICATIONS

Aberathne et al., "Smart Mobile Bot Detection Through Behavioral Analysis", Springer Nature Singapore Pte Ltd, 2018 (Year: 2018).*

Office Action in Indian Appln. No. 202027048923, dated Jun. 2, 2022, 6 pages.

Notice of Allowance in Korean Appln. No. 10-2020-7034903, dated Oct. 27, 2022, 3 pages (with English translation).

Benes [online], "Five Charts: The State of Ad Fraud," May 20, 2019, retrieved on Nov. 11, 2020, retrieved from URL https://www.emarketer.com/content/five-charts-the-state-of-ad-fraud?ecid=NL1009, 10 pages.

PCT International Search Report and Written Opinion in International Appln. No. PCT/US2020/029467, dated Jun. 17, 2020, 16 pages.

Silverman et al. [online], "Popular Apps in Google's Play Store Are Abusing Permissions and Committing Ad Fraud," Apr. 17, 2019, retrieved on Nov. 11, 2020, retrieved from URL https://www.buzzfeednews.com/article/craigsilverman/google-play-store-ad-fraud-du-group-baidu, 17 pages.

Silverman [online], "These Hugely Popular Android Apps Have Been Committing Ad Fraud Behind Users' Backs," Nov. 26, 2018, retrieved on Nov. 11, 2020, retrieved from URL https://www.buzzfeednews.com/article/craigsilverman/android-apps-cheetah-mobile-kika-kochava-ad-fraud, 14 pages.

Takahashi [online], "Appsflyer: Mobile app fraud hit $800 million in Q1, up 30%," Apr. 2018, retrieved on Nov. 11, 2020, retrieved from URL https://venturebeat.com/2018/04/02/appsflyer-mobile-app-fraud-hit-800-million-in-q1-up-30/, 8 pages.

Wikipedia.com [online], "Replay attack," retrieved on Nov. 11, 2020, retrieved from URL https://en.wikipedia.org/wiki/Replay_attack, 5 pages.

Developer.Android.com [online], "Motion Event," retrieved on Dec. 29, 2020, retrieved from URL https://developer.android.com/reference/android/view/MotionEvent, 134 pages.

DataTracker.ietf.org [online], "Oblivious Pseudorandom Functions (OPRFs) using Prime-Order Groups," retrieved on Dec. 29, 2020, retrieved from URL https://datatracker.ietf.org/doc/draft-sullivan-cfrg-voprf/, 2 pages.

Notice of Allowance in Japanese Appln. No. 2020-565922, dated Feb. 16, 2022, 5 pages (with English translation).

PCT International Preliminary Report on Patentability in International Appln. No. PCT/US2020/029467, dated Feb. 24, 2022, 10 pages.

* cited by examiner

IMPROVING DATA INTEGRITY WITH TRUSTED CODE ATTESTATION TOKENS

CROSS-REFERENCE TO RELATED APPLICATION

This application is a National Stage Application under 35 U.S.C. § 371 and claims the benefit of International Application No. PCT/US2020/029467, filed Apr. 23, 2020, which claims priority to U.S. Application No. 62/885,972, filed Aug. 13, 2019, the disclosure of which is incorporated herein by reference.

BACKGROUND

This document relates to improving data integrity using trusted code attestation tokens. Users interacting with content on the Internet generate interaction data that is easily manipulated. The manipulated interaction data can be used in fraudulent schemes or to otherwise undermine online systems.

SUMMARY

In general, one innovative aspect of the subject matter described in this specification can be embodied in a method that includes receiving, at a user device and at a particular time, an input indicating interaction associated with a digital component that is (i) provided by a content provider and (ii) presented by a user interface of the user device. The method includes determining, by a trusted program of the user device, that the interaction is valid by: detecting, by the trusted program, that the user interface of the user device was active and actively presenting the digital component at the particular time, determining, by the trusted program and in response to detecting that the user interface of the user device was active and actively presenting the digital component at the particular time, a set of attributes of the digital component, including a location within the user interface at which the digital component was actively presented, comparing, by the trusted program, each attribute of the determined set of attributes with a corresponding attribute in a set of reference attributes of the digital component that are provided by the content provider, and evaluating validity of the interaction, based on the comparison and by the trusted program, wherein the interaction is deemed valid in response to (i) the comparison indicating a match between the determined set of attributes and the set of reference attributes and (ii) the detection that the user interface of the user device was active and actively presenting the digital component at the particular time. The method includes generating, by the trusted program and based on the determination that the interaction is valid based on the validity evaluation, a digitally signed token that attests the validity of the interaction with the digital component. The method includes providing, by the trusted program and to a third party, the digitally signed token as an indication of the validity of the interaction.

These and other embodiments can each optionally include one or more of the following features. The method can also include detecting, by the trusted program, a trigger event at a first time before the particular time indicating a specific user interaction with a display of the user device. The method can also include detecting, by the trusted program and after the first time at the particular time, a target event indicating a different user interaction with the display of the user device. The method can also include identifying, by the trusted program and based on detecting the trigger event at the first time before the particular time and the target event at the particular time, a digital component slot in which the digital component was presented associated with the trigger event and the target event. The method can also include determining, by the trusted program and based on (i) detecting the trigger event at the first time before the particular time and the target event at the particular time and (ii) identifying the digital component slot associated with the trigger event and the target event, (a) a time period between the first time and the particular time and (b) that an unverified user interaction with the digital component has occurred. Receiving the input indicating the interaction with the digital component can be performed in response to the determination of (a) the time period between the first time and the particular time and (b) that an unverified user interaction with the digital component has occurred. The unverified user interaction can be the interaction indicated by the input.

In some implementations, the set of determined attributes of the digital component includes an application within which the digital component is presented.

In some implementations, the set of determined attributes of the digital component includes one of a size, a type, and the content of the digital component.

In some implementations, the interaction associated with the digital component is an impression of the digital component to a user of the user device.

In some implementations, the interaction associated with the digital component is a click on the digital component by a user of the user device.

In some implementations, the interaction associated with the digital component comprises providing, by the user device and to the third party device, a request for the digital component.

In some implementations, the digitally signed token attests that the user device generated (i) the request and (ii) the token.

In some implementations, the digitally signed token attests that the request for the digital component has not been modified.

In some implementations, the digitally signed token attests that (i) the request was generated by the user device and (ii) the user device is not modified or a device emulator.

Other embodiments of this aspect include corresponding systems, apparatus, and computer programs, configured to perform the actions of the methods, encoded on computer storage devices.

Particular embodiments of the subject matter described in this document can be implemented so as to realize one or more of the following advantages. The proposed techniques improve the integrity of generated data, and reduce the likelihood of fraud by relying on trusted code to verify the validity of an event, such as a user interaction with a digital component. Trusted code, such as operating system code or binary code of a trusted program (e.g., a web browser), is prohibitively difficult to infiltrate, and therefore expending resources to compromise the integrity of such code is not generally economically feasible at scale. Thus, the proposed techniques are both more reliable and less likely to be targeted for vulnerabilities.

The trusted application can be, for example, a portion of the operating system of a user device, such as a device driver. The device driver is the first piece of software that responds to certain events, such as a touch event for a touch screen. Before any third party application level code receives data indicating that the user touched the screen, the device driver can detect and verify the touch event such that there is no opportunity for the third party application code to interfere by falsifying the interaction. The attestation token verification method allows for verification of interaction events without vulnerabilities that facilitate click fraud and impression fraud.

The generation of attestation tokens by trusted code and the use of these tokens in verifying user interaction events is complementary to existing fraud detection methods, and provides an additional layer of security. This method provides higher quality fraud detection at a low additional computational cost. Every time a user interaction with a digital component is detected, the provider of the digital component transmits a request for verification of the interaction to the user device. The digital component distribution system already incurs a cost for receiving and processing the request, so the added cost of on-device verification is not a significant additional burden. There are three parts to the method: (1) on-device or in-browser verification by generating and signing the attestation token, which takes as little as a fraction of a millisecond; (2) processing by a machine learning model to verify declared properties of the digital component, which can depend on how sophisticated the machine learning model is; and (3) verifying, by the provider of the digital component, the digital signature of the attestation token to make sure the signature is valid, which can also take as little as a fraction of a millisecond. Overall, the additional computational time and cost of performing the attestation token verification method is insignificant when used in conjunction with existing solutions.

Current fraud detection methods are generally based on statistical analysis and require human input, such as manually defined rules. For example, one rule can specify that if a click event on a particular device is always in the upper right corner at the same exact coordinates, the click is mostly likely a fraudulent event. In order to determine and define these rules, however, human input is needed to analyze data to find fraudulent patterns. Thus, the proposed technique requires less resources for development and verification as compared to traditional methods. Additionally, the proposed techniques protect user privacy during event validation because attestation tokens are generated on-device or in-browser without the need to transmit user interaction data to third party applications. The proposed techniques can analyze, process, and store user data locally. By reducing the need for fraud detection based on statistical analysis methods, the attestation token method reduces risk of compromising user data with respect to other methods.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
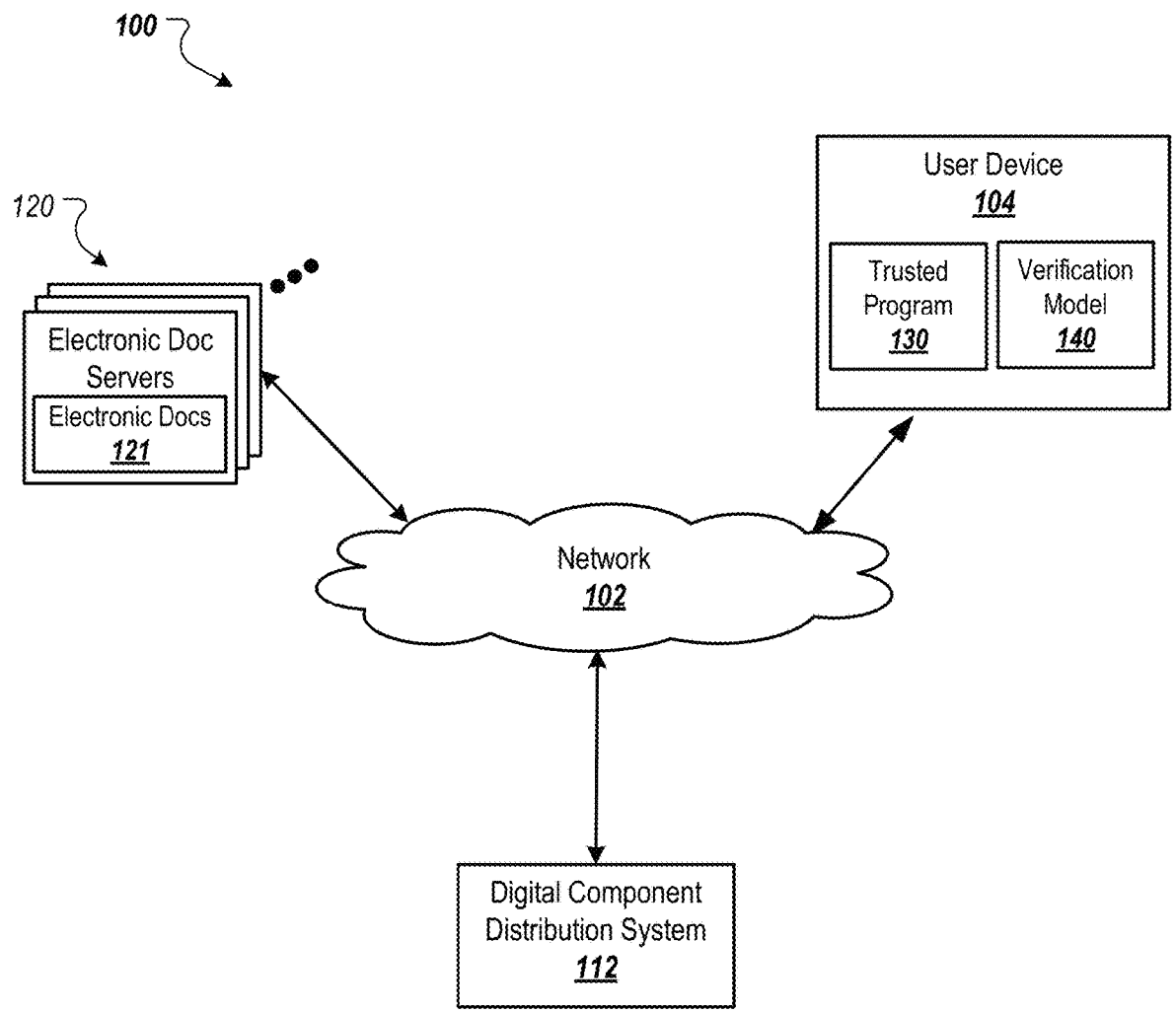
FIG. 1 is a block diagram of an example environment in which user interactions with digital components that are distributed for presentation with electronic documents are verified through a deterministic, cryptographic process.

This document describes methods, systems, and devices that improve data integrity and prevent impression and/or click fraud through deterministic, cryptographic techniques. Fraud is rampant in the digital ecosystem, and results in billions of dollars of lost resources and revenue. To reduce and/or eliminate this fraudulent activity, techniques are needed that improve the integrity of the data collected from client devices. The proposed techniques include trusted code (e.g., executing in the client device) receiving a request to verify a user interaction, determining that the user interaction is a valid interaction, generating an encrypted token that attests to the validity of the user interaction and the request, and providing the encrypted token to a third party, such as the provider of a digital component that was interacted with. Trusted code, such as operating system code or binary code of an application, is less prone to fraud and falsification, and user devices can be updated to include this improved fraud detection feature easily through updates or patches to the trusted code. This trusted code generates cryptographic tokens that attest to the validity of user interactions. These tokens, referred to as attestation tokens, are digitally signed by a user device prior to being provided to a third party to attest that events such as impressions and click events were legitimate interactions. For example, signed attestation tokens can be provided to digital component distribution systems to verify the digital signatures and detect fraud, such as impression and click fraud, even through chains of entities with multiple different entities.

Note that the techniques described in this document can also be implemented in situations where a user is browsing through available applications (e.g., in an online analytics application or a web browser) or in other environments (e.g., on publisher webpages). For brevity, much of the description that follows will refer to the data analytics environment, but it should be appreciated that the techniques discussed throughout this document can be applied in other situations where it is desirable to improve the integrity of data representing interactions with client devices. For example, the techniques discussed throughout this document could also be used to verify user interactions at a client device that is requesting access to a particular server, a particular website, a particular set of data, or a particular account to ensure that the request is valid.

As used throughout this document, the phrase "digital component" refers to a discrete unit of digital content or digital information (e.g., a video clip, audio clip, multimedia clip, image, text, or another unit of content). A digital component can be electronically stored in a physical memory device as a single file or in a collection of files, and digital components can take the form of video files, audio files, multimedia files, image files, or text files and include advertising information, such that an advertisement is a type of digital component. Generally, a digital component is defined by (or provided by) a single provider or source (e.g., an advertiser, publisher, or other content provider), but could be a combination of content from multiple sources. Digital components from multiple different sources can be combined into a single electronic document (e.g., collection of various different digital components), and portions of various digital components from different sources can be combined into a single digital component with information extracted from search results (or other portions of content).

FIG. 1 is a block diagram of an example environment 100 in which digital components are distributed for presentation with electronic documents. Users' interactions with these digital components are collected and used to generate training data. The generated data is used to train a verification model that determines the validity of interactions. The example environment 100 includes a network 102, such as a local area network (LAN), a wide area network (WAN), the Internet, or a combination thereof. Network 102 connects electronic document servers 120, user device 104, and a digital component distribution system (DCDS) 112 (also referred to as a distribution system). The example environment 100 may include many different electronic document servers 120, and types of user devices 104.

A user device 104 is an electronic device that is capable of requesting and receiving resources over network 102. Example user devices 104 include personal computers, mobile communication devices, and other devices that can send and receive data over network 102. In some examples, user device 104 is a mobile device, such as a cellphone, a virtual reality device (e.g., implemented in a headset or other device such as a combination of a speaker and a display), a smartphone, a personal digital assistant (e.g., implemented in a tabletop speaker or other device such as a combination of a speaker and a display), or a tablet, and communicates over a wireless network. A user device 104 typically includes a user application, such as a web browser, to facilitate the sending and receiving of data over network 102, but native applications executed by user device 104 can also facilitate the sending and receiving of data over network 102.

User device 104 includes a trusted program 130 and a verification model 140. Trusted program 130 includes trusted code from a reliable source that is difficult to falsify. For example, trusted program 130 can be an operating system, a portion of an operating system, a web browser, etc. Generally, trusted program 130 is difficult to infiltrate, and the amount of time and effort that a perpetrator would need to expend to tamper with trusted program 130 is prohibitively high. Additionally, because trusted program 130 is provided and maintained by a reliable source, any vulnerabilities that arise can be addressed by the source.

Trusted program 130 can be local to user device 104. For example, trusted program 130 can be a device driver of the operating system of user device 104. In some implementations, trusted program 130 operates entirely locally to user device 104, reducing the need to transmit user information. In some implementations, trusted program 130 can operate locally to user device 104 and over a network, such as network 102. For example, trusted program 130 can be a web browser that is installed on user device 104 and transmits and receives information over network 102.

Verification model 140 can be a system that trains and implements a machine learning model to verify interaction events from user device 104. Verification model 140 can be, for example, a neural network that receives training examples and user or profile information as input and outputs a prediction of whether an interaction event itself or the characteristics of the event is valid. For example, verification model 140 can determine whether an event, such as a click, has occurred. Verification model 140 can also determine whether characteristics of an event, such as the content of a digital component for which an impression occurred, are valid.

User device 104 can gather user interaction data to generate training data to input to verification model 140. User device 104 can select a random sample to obtain negative examples to train, for example, a logistic regression model 140. User device 104 can take multiple samples of user interaction data to generate one or more sets of training data.

When generating the set of training data, user device selects training features used within the set of training data from historical user interactions with digital components. User device 104 determines training example weights in one of several ways. In some implementations, user device 104 can weight each training example equally, and sample only data points within a predetermined period of time. In some implementations, user device 104 can use decay functions to weight training examples differently depending on how recent the example is.

The system can split training, validation, and generating test data into various percentages of modelling time and resources. The system can also cross validate the output of the model.

Verification model 140 receives the training data and trains a machine learning model to determine whether an event is legitimate. The machine learning model may use any of a variety of techniques such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, association rules, inductive logic, clustering, maximum entropy classification, learning classification, etc. In some examples, the machine learning model uses supervised learning. In some examples, the machine learning model uses unsupervised learning. The machine learning model can also use wide and deep learning, long short-term memory modeling, boosting, matrix factorization, user embedding, or item embedding.

Verification model 140 is used to determine whether an interaction is a valid interaction. The output of verification model 140 is a determination of whether the interaction is a valid interaction. In some implementations, verification model 140 can output a likelihood that the interaction is a valid interaction.

An electronic document is data that presents a set of content at a user device 104. Examples of electronic documents include analytical reports, webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 121 ("Electronic Docs") can be provided to user device 104 by electronic document servers 120 ("Electronic Doc Servers"). For example, the electronic document servers 120 can include servers that host publisher websites. In this example, user device 104 can initiate a request for a resource, such as a given publisher webpage, and the electronic document server 120 that hosts the given publisher webpage can respond to the request by sending machine executable instructions that initiate presentation of the given webpage at user device 104.

In another example, the electronic document servers 120 can include app servers from which user device 104 can download apps. In this example, user device 104 can request a resource, such as files required to install an app, download the files, and then execute the downloaded app locally.

Electronic documents 121 can include a variety of content. For example, an electronic document 121 can include static content (e.g., text or other specified content) that is within the electronic document itself and/or does not change over time. Electronic documents 121 can also include dynamic content that may change over time or on a per-request basis. For example, a publisher of a given electronic document 121 can maintain a data source that is used to populate portions of the electronic document 121. In this example, the given electronic document 121 can include one or more tags or scripts that cause user device 104 to request content from the data source when the given electronic document 121 is processed (e.g., rendered or executed) by user device 104. User device 104 integrates the content obtained from the data source into the given electronic document 121 to create a composite electronic document including the content obtained from the data source. Electronic documents can also include dynamically generated reports that process data from other sources. For example, a given electronic document 121 can be a dynamically generated report that analyzes data from multiple other data sources, such as user interactions with other electronic documents 121.

In some situations, a given electronic document 121 can include one or more digital component tags or digital component scripts that reference DCDS 112. In these situations, the digital component tags or digital component scripts are executed by user device 104 when the given electronic document 121 is processed by user device 104. Execution of the digital component tags or digital component scripts configures user device 104 to generate a request for a resource including one or more digital components (referred to as a "component request"), which is transmitted over network 102 to DCDS 112. For example, a digital component tag or digital component script can enable user device 104 to generate a packetized data request including a header and payload data. The component request can include event data specifying features such as a name (or network location) of a server from which the digital component is being requested, a name (or network location) of the requesting device (e.g., user device 104), and/or information that DCDS 112 can use to select one or more digital components provided in response to the request. The component request is transmitted, by user device 104, over network 102 (e.g., a telecommunications network) to a server of DCDS 112.

The component request can include event data specifying other event features, such as the electronic document being requested and characteristics of locations of the electronic document at which digital components can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to DCDS 112. Similarly, event data specifying keywords associated with the electronic document ("document keywords") or entities (e.g., people, places, or things) that are referenced by the electronic document can also be included in the component request (e.g., as payload data) and provided to DCDS 112 to facilitate identification of digital components that are eligible for presentation with the electronic document. The event data can also include a search query that was submitted from user device 104 to obtain a search results page, and/or data specifying search results and/or textual, audible, or other visual content that is included in the search results.

Component requests can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests can be transmitted, for example, over a packetized network, and the component requests themselves can be formatted as packetized data having a header and payload data. The header can specify a destination of the packet and the payload data can include any of the information discussed above.

DCDS 112 chooses digital components that will be presented with the given electronic document in response to receiving the component request and/or using information included in the component request. The system 110 uses data generated from user interactions with digital components such as electronic documents 121 to personalize the selection of electronic documents 121 presented to user devices 104.

User device 104 can receive data that causes user device 104 to request a digital component from DCDS 112. For example, DCDS 112 can choose a digital component to be presented to user device 104. To preserve the integrity of the process, user device 104 can certify that it is the device requesting a digital component, and that the request is a genuine request. User device 104 can receive data that indicates an interaction with a digital component. The provider of the digital component then generates a request for validation of the interaction to user device 104. When user device 104 receives data indicating an interaction with a digital component, user device 104 begins a process to validate the interaction. The interaction can simply be the presentation and subsequent viewing of the digital component by a user of user device 104, or an impression. The interaction can be an explicit interaction by the user of user device 104 with the digital component. For example, the interaction can be a click on the digital component by the user of user device 104. In the context of digital components, the interaction can be an impression or click, and the digital component distribution system can be compensated for each interaction. Such interactions can easily be falsified, and thus the proposed technique reduces instances of fraud by verifying, by a trusted program, the validity of each interaction.

User device 104 can verify the request for the digital component or the interaction with the digital component by generating a deterministic, cryptographic token that attests to the validity of an interaction, or an attestation token. For example, trusted program 130 can generate an attestation token based on the interaction data and historical user data. When generating an attestation token, user device 104 generates a public key and a private key. Trusted program 130 uses a consistent public/private key infrastructure, and allows for consistent fraud detection solution across platforms. Trusted program 130 securely stores the private key locally and sends out the public key when user device 104 issues a request that is sensitive or prone to fraud, or when user device 104 receives a request for validation of an interaction. Then user device 104 generates an attestation token that includes parameters prone to falsification and signs it with the private key. User device 104 can attach the digitally signed attestation token to a request for a digital component or provide the token in response to a request for validation of an interaction with a digital component. The token can be used to verify that the request was generated from the particular device, that the particular device performed the interaction, that the interaction was with the particular digital component, and/or that request or digital component parameters were not modified during transmission.

The attestation token allows content providers to independently verify the source of each request, thus reducing falsified requests and instances of lost resources due to fraud. Because attestation tokens are digitally signed by user device 104 with the private key, content providers can authenticate requests with the attestation token attached to the request to ensure that both the request and the token were generated by user device 104. Digital component distribution systems (such as DCDS 112) and/or other devices can authenticate requests and/or interactions with the attestation token provided in response to the request for verification to ensure that the interaction occurred and/or that the interaction was with the declared digital component. The cryptographic nature of the attestation token certifies the integrity of the request and/or interaction and allows the content provider and the digital component distribution system, among other third parties, to be secure in the knowledge that the request and/or interaction was not created fraudulently or modified by any intermediaries. Content providers and/or digital component distribution systems can use the attestation token to determine whether the request is a fresh request or a replay attack, and/or whether the interaction was generated by a compromised device, such as a rooted device or a device emulator, among other fraudulent activity.

Figure 2:
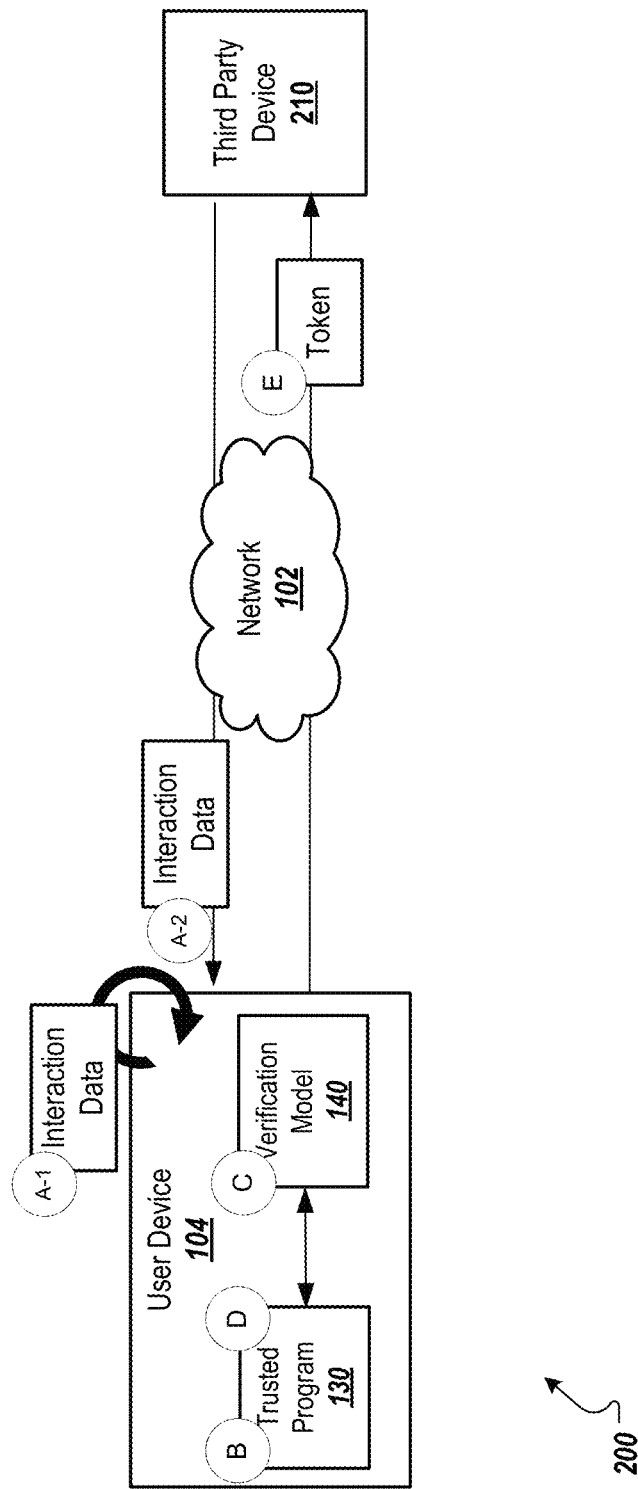
FIG. 2 is an example data flow for verifying user interactions with digital components.

FIG. 2 is an example data flow 200 for implementing a validation process in the example environment of FIG. 1. Operations of the data flow 200 are performed by the user device 104. Stages of the flow 200 are performed within a network environment, such as the environment 100.

In some examples, user device 104 is a mobile device having a touchscreen, such as a cellphone, a smartphone, or a tablet, and communicates over a wireless network, such as network 102. In some example, user device 104 can be a desktop device, such as a laptop, a desktop computer, a workstation, among other devices, and may have a touchscreen. Third party device 210 can be, for example, a server that communicates over a wireless network, such as network 102, or wired network separate from the wireless network over which user device 104 communicates. For example, user device 104 can be a smartphone that communicates over a wireless cellular network, while third party device 210 is a remote server that communicates over a wired network. In some examples, third party device 210 can be DCDS 112 or an electronic doc server 120. For example, third party device 210 can be electronic doc server 120, and can verify the validity of an interaction event prior to compensating DCDS 112.

In this particular example, user device 104 is a smartphone having a touchscreen; communications performed as stages of flow 200 occur over network 102, which can be the Internet; and third party device 210 is an electronic doc server 120 that provides a digital component served to user device 104 by DCDS 112.

Impression Verification

The flow 200 is a verification process, and in this example, the flow 200 illustrates the data flow of a process for verifying impressions. In this example, user device 104 renders the digital component to be displayed to a user through a UI of user device 104. An SDK or browser of user device 104 which is communicatively connected to an electronic doc server 120 that provided the digital component can render the digital component within, for example, a digital component slot. Upon rendering the digital component, the content provider SDK of user device 104 requests an impression attestation token from trusted program 130 of user device 104. Trusted program 130 of user device 104 can be, for example, the OS of user device 104 or a web browser application installed on user device 104.

The flow 200 begins with stage (A), in which user device 104 receives data indicating an interaction event at a particular time. In this example, stage (A) is depicted as stage (A-1), in which user device 104 receives data indicating an interaction event with a digital component. The data can indicate an event in which data causing the content provider SDK of user device 104 to render the digital component within the digital component slot. The data indicates that the digital component was provided by a content provider. For example, the digital component can be provided by an electronic doc server 120. In this particular example, third party device 210 is the electronic doc server 120 that provided the digital component for which the interaction event data was provided to user device 104. The digital component was presented to a user of user device 104 through a user interface (UI) of user device 104. For example, the digital component can be presented to a user of smartphone user device 104 through its touchscreen. The data indicates that the interaction event was an interaction with a digital component. For example, the digital component can be served to user device 104 by DCDS 112, and the user interaction can simply be the rendering of the digital component within the digital component slot such that a user of user device 104 can view the digital component, known as an impression. Upon receiving the data causing rending of the digital component within the digital component slot, the SDK of user device 104 requests verification of the interaction by requesting an attestation token from trusted program 130 of user device 104.

The flow 200 continues with stage (B), in which trusted program 130 of user device 104 determines that the data indicating the interaction with the digital component is valid. Trusted program 130 determines that the data indicating the interaction is valid by detecting that the UI of user device 104 was active and actively presenting the digital component at the particular time (i.e. the digital component was visible to the user) and determining one or more attributes of the digital component are valid.

In this example, the interaction indicated by the data is an impression, or the rendering of the digital component within the digital component slot such that a user of user device 104 can view the digital component. Trusted program 130 determines that the data indicating the interaction is valid by making sure that the portion of the UI of user device 104 in which the digital component was displayed was in the foreground of user device 104's display at the particular time.

Trusted program 130 can also determine attributes of the digital component. For example, trusted program 130 can determine the size, content, and location of the digital component.

The flow 200 continues with stage (C), in which trusted application 130 uses verification model 140 to compare the determined attributes to a set of declared attributes of the digital component and evaluate the validity of the interaction based on the comparison. Verification model 140 can compare the determined attributes of the digital component to a set of declared attributes of the digital component. The set of declared attributes can be provided by, for example, the electronic doc server 120 that provides the digital component, the digital component, or the SDK rendering the digital component. Verification model 140 can evaluate the validity of the interaction based on the comparison by comparing each of the determined attributes of the digital component to the set of declared attributes of the digital component. For example, verification model 140 can compare and confirm that the determined location coordinates of the digital component matches the declared location coordinates of the digital component; that the digital component is a video and matches the declared type of the digital component; and that the digital component is 300×100 pixels and matches the declared size of the digital component.

Verification model 140 can compare the source of the digital component to the declared source of the digital component. For example, electronic doc server 120 requests verification of an interaction with a digital component, and verification model 140 can compare a determined source of the content of the digital component to a declared source (in this example, electronic doc server 120) to verify that the interaction is with the correct digital component.

Verification model 140 can compare the content of the digital component to the declared content of the digital component. For example, verification model 140 can determine that the digital component is an image that relates to athletic sneakers and confirm that this matches the declared content of the digital component.

Verification model 140 can perform one or more of these comparisons based on whether the interaction is suspicious. For example, verification model 140 can use trained machine learning models that are specific to the user, and can detect whether an interaction deviates from interactions previously taken by the user or other users having similar characteristics. Each unverified interaction can be given an abnormality score with respect to past interactions. If an unverified interaction is above a threshold abnormality score, then verification model 140 can perform comparisons of more attributes for additional security.

Verification model 140 can determine that, based on the digital component being displayed in the foreground of user device 104's display at the particular time and the determined attributes matching the set of declared attributes, the interaction is a valid interaction. For example, verification model 140 of user device 104 can automatically perform comparisons of determined attributes of the digital component and the set of declared attributes of the digital component to evaluate the validity of the interaction. In this particular example, the interaction is an impression.

To maintain an accurate registry of digital components, trusted program 130 can obtain information about the portion of the UI of user device 104 in which the digital component is presented. For example, trusted program 130 can determine in which application running on user device 104 the digital component slot and the digital component is presented. Trusted program 130 can then update a registry of digital components to include the application and the digital component in the registry. The registry maintains screen areas occupied by digital components, and can provide verification data for the location of the digital component. For example, the registry can be updated based on digital components that are currently displayed in particular areas of a screen of user device 104.

The flow 200 continues with stage (D) in which trusted application 130 of user device 104 generates an attestation token based on the determination that the interaction is valid. Trusted application 130 can generate a public/private pair for the token and generate the attestation token itself through cryptographic methods.

The flow 200 continues with stage (E) in which user device 104 digitally signs the attestation token and provides the token to third party device 210. In this particular example, third party device 210 is the electronic doc server 120 that provided the digital component.

Click Verification

The flow 200 is a verification process, and in this example, the flow 200 illustrates the data flow of a process for verifying clicks. In this example, user device 104 renders the digital component to be displayed to a user through a UI of user device 104. User device 104 can render the digital component within a digital component slot for presentation to the user. Trusted program 130 of user device 104 can be, for example, a portion of the OS of user device 104, such as a device driver for the display of user device 104, or a web browser application installed on user device 104. In this particular example, the display is a touchscreen display. In some implementations, the device driver can be a driver for a physical user interface device, such as a mouse or trackball, for user device 104.

Trusted program 130 can detect a trigger event that indicates a specific user interaction with a display of user device 104. For example, device driver 130 can receive a finger down event from a user touching the touchscreen of user device 104. Device driver 130 is part of the operating system of user device 104, and is the first piece of software that receives the finger down event. Device driver 130 can detect the finger down event and attributes of the event, such as a time, a location, an amount of force used, among other attributes.

At a later time, trusted program 130 can detect a target event that indicates a different user interaction with the display of user device 104. For example, device driver 130 can receive a finger up event from a user picking their finger up from the touchscreen of user device 104. Device driver 130 can detect the finger up event and attributes of the event, such as a time, a location, an amount of force used, among other attributes.

Upon detecting the target event and the time of the target event, device driver 130 identifies the most recent trigger event. In this particular example, the most recent trigger event is the most recent finger down event. Device driver 130 can then determine a digital component slot associated with the finger up event and most recent finger down event. Additionally, once the finger up event and the most recent finger down event are identified, device driver 130 can use verification model 140 to verify the click event. For example, device driver 130 can determine an amount of time between the finger up event and the most recent finger down event and provide the amount of time to verification model 140 for verification of the interaction as described further below. Device driver 130 can also determine a distance between the finger up event and the most recent finger down event by calculating the distance between the determined coordinates of the events and provide the distance to verification model 140 as input for verification of the interaction as described below.

In this particular example, the flow 200 begins with stage (A), in which user device 104 receives data indicating an interaction event at a particular time after determining the amount of time between the finger down event and the subsequent finger up event and that an unverified user interaction with the digital component has occurred.

The flow 200 continues with stage (B) as described above with respect to the impression verification process.

The flow 200 continues with stage (C), in which trusted application 130 uses verification model 140 to compare the determined attributes to a set of declared attributes of the digital component and evaluate the validity of the interaction based on the comparison. In addition to the description of stage (C) above, verification model 140 can determine, based on the amount of time and detected attributes of the finger down and finger up events, whether the click was a legitimate click. Verification model 140 can automatically determine a definition of a click that is likely to be performed by a user. Verification model 140 can determine a minimum and a maximum threshold for an amount of time between the finger down event and the subsequent finger up event acceptable for a click. For example, if a time between the finger down event and the subsequent finger up event is below a minimum threshold amount of time in which it is possible for a human to perform the actions, verification model 140 can determine that the click was likely a result of a bot attack or a fraudulent click. Additionally, verification model 140 can determine a minimum and maximum threshold for a distance between the finger down event and the subsequent finger up event acceptable for a click. For example, a minimum distance threshold can initially be set as the lower end of the range of distances that a human's finger travels from an initial finger down event to a finger up event from releasing from a touchscreen click. Verification model 140 can automatically determine a maximum distance threshold by determining at what distance a finger down event and finger up event pair would be considered a scroll. For example, if a distance between the finger down event and the subsequent finger up event is above a maximum threshold distance, verification model 140 can determine that the finger down event and the finger up event together constitute a scrolling motion instead of a click. In some implementations, verification model 140 can be trained using data for a particular user, thereby personalizing the verification results to each user.

The flow 200 continues with stage (D) and concludes with stage (E) as described above with respect to the impression verification process.

Request Verification

The flow 200 is a verification process, and in this example, the flow 200 illustrates the data flow of a process of generating a request for a digital component and attaching a token to the request. The flow 200 begins with stage (A). In this example, stage (A) is depicted as stage (A-2), in which user device 104 receives data indicating an interaction event with a digital component. In this example, user device 104 receives data that causes user device 104 to request a digital component from a digital component distribution system. Trusted program 130 of user device 104 can be, for example, a portion of the OS of user device 104 or a web browser application installed on user device 104. In this particular example, third party device 210 is DCDS 112.

The flow 200 continues from stage (A-2) to stage (D) in which trusted application 130 of user device 104 generates an attestation token based on the determination that the interaction is valid. Trusted application 130 can generate a public/private pair for the token and generate the attestation token itself through cryptographic methods.

The flow 200 continues with stage (E) in which user device 104 digitally signs the attestation token and provides the token to third party device 210 along with the request for a digital component.

Figure 3:
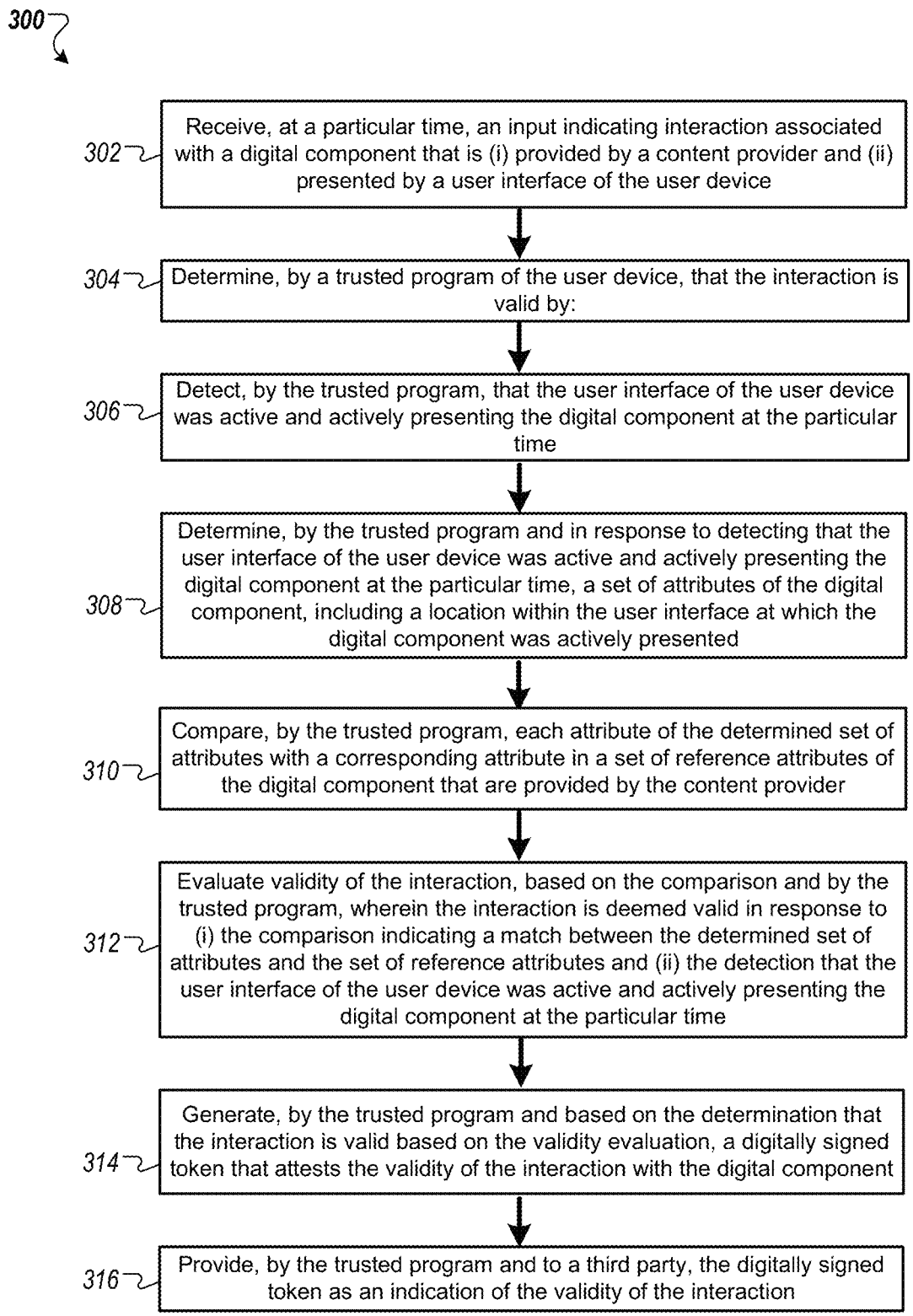
FIG. 3 is a flow chart of an example process for verifying user interactions with digital components through the generation of an attestation token.

FIG. 3 is a flow chart of an example process 300 for validating an interaction event. In some implementations, operations of the process 300 can be implemented by a user device. For example, operations of the process 300 can be implemented by user device 104 of FIGS. 1-2. In some implementations, the process 300 can be implemented as instructions stored on a non-transitory computer readable medium, and when the instructions are executed by a user device, the instructions can cause the user device to perform operations of the process 300.

Process 300 begins with receiving, at a user device and at a particular time, an input indicating interaction associated with a digital component that is (i) provided by a content provider and (ii) presented by a user interface of the user device (302). For example, user device 104 can receive data causing presentation of the digital component within a digital component slot of a UI of the user device 104. In this example, the digital component is provided by an electronic doc server 120. The digital component is presented by a user interface of user device 104.

Process 300 continues with determining, by a trusted program of the user device, that the interaction is valid (304). Trusted program 130, which in this example is the OS 130 of user device 104, can determine that the interaction indicated by the input data is valid.

Determining that the interaction is valid includes detecting, by the trusted program of the user device, that the user interface of the user device was active and actively presenting the digital component at the particular time (306). For example, trusted program 130 of user device 104 can determine that the digital component was in the foreground of the user interface of user device 104, and that the digital component was visible at the particular time.

Determining that the interaction is valid also includes determining, by the trusted program and in response to detecting that the user interface of the user device was active and actively presenting the digital component at the particular time, a set of attributes of the digital component, including a location within the user interface at which the digital component was actively presented (308). For example, trusted program 130 can determine a set of attributes of the digital component, such as the size, location, and content, among other attributes.

Determining that the interaction is valid also includes comparing, by the trusted program of the user device, each attribute of the determined set of attributes with a corresponding attribute in a set of reference attributes of the digital component that are provided by the content provider (310). For example, trusted program 130 can use verification model 140 to compare each attribute of the determined set of attributes with a corresponding attribute in a set of reference attributes. The reference attributes can be a declared set of attributes provided by the content provider of the digital component, electronic doc server 120.

Determining that the interaction is valid also includes evaluating validity of the interaction, based on the comparison and by the trusted program, wherein the interaction is deemed valid in response to (i) the comparison indicating a match between the determined set of attributes and the set of reference attributes and (ii) the detection that the user interface of the user device was active and actively presenting the digital component at the particular time (312). For example, trusted program 130 can use verification model 140 to determine that the interaction is valid in response to the comparison indicating a match between the determined set of attributes and the set of reference attributes, and the detection that the digital component was visible and presented to the user of user device 104 at the particular time.

Process 300 continues with generating, by the trusted program of the user device and based on the determination that the interaction is valid based on the validity evaluation, a digitally signed token that attests the validity of the interaction with the digital component (314). For example, trusted program 130 can generate an attestation token using cryptographic methods. The attestation token attests to the validity of the interaction.

Process 300 also includes providing, by the trusted program of the user device and to a third party, the digitally signed attestation token as an indication of the validity of the interaction (316). For example, trusted program 130 can transmit the digitally signed attestation token to third party device 210, electronic doc server 120, and DCDS 112, among other devices.

Figure 4:
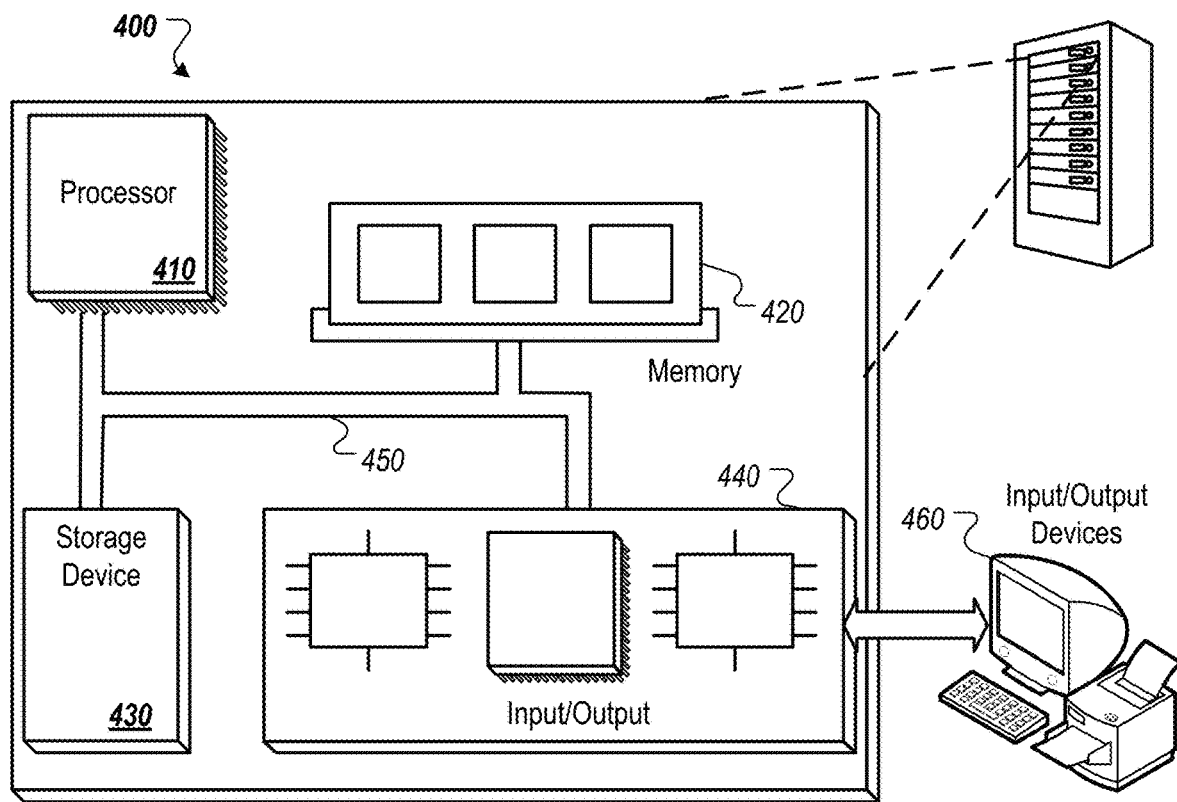
FIG. 4 is a block diagram of an example computing system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, at a user device and at a particular time, an input indicating interaction associated with a digital component that is (i) provided by a content provider and (ii) presented by a user interface of the user device;
determining, by a trusted program of the user device, that the interaction is valid by:
detecting, by the trusted program, that the user interface of the user device was active and actively presenting the digital component at the particular time;
determining, by the trusted program and in response to detecting that the user interface of the user device was active and actively presenting the digital component at the particular time, a set of attributes of the digital component, including a location within the user interface at which the digital component was actively presented;

comparing, by the trusted program, each attribute of the determined set of attributes with a corresponding attribute in a set of reference attributes of the digital component that are provided by the content provider;

evaluating validity of the interaction, based on the comparison and by the trusted program, wherein the interaction is deemed valid in response to (i) the comparison indicating a match between the determined set of attributes and the set of reference attributes and (ii) the detection that the user interface of the user device was active and actively presenting the digital component at the particular time;

generating, by the trusted program and based on the determination that the interaction is valid based on the validity evaluation, a digitally signed token that attests the validity of the interaction with the digital component; and providing, by the trusted program and to a third party, the digitally signed token as an indication of the validity of the interaction.

2. The method of claim 1, further comprising:

detecting, by the trusted program, a trigger event at a first time before the particular time indicating a specific user interaction with a display of the user device;

detecting, by the trusted program and after the first time at the particular time, a target event indicating a different user interaction with the display of the user device;

identifying, by the trusted program and based on detecting the trigger event at the first time before the particular time and the target event at the particular time, a digital component slot in which the digital component was presented associated with the trigger event and the target event; and determining, by the trusted program and based on (i) detecting the trigger event at the first time before the particular time and the target event at the particular time and (ii) identifying the digital component slot associated with the trigger event and the target event, (a) a time period between the first time and the particular time and (b) that an unverified user interaction with the digital component has occurred, wherein receiving the input indicating the interaction with the digital component is performed in response to the determination of (a) the time period between the first time and the particular time and (b) that an unverified user interaction with the digital component has occurred, and wherein the unverified user interaction is the interaction indicated by the input.

3. The method of claim 1, wherein the set of determined attributes of the digital component includes an application within which the digital component is presented.

4. The method of claim 1, wherein the set of determined attributes of the digital component includes one of a size, a type, and the content of the digital component.

5. The method of claim 1, wherein the interaction associated with the digital component is an impression of the digital component to a user of the user device.

6. The method of claim 1, wherein the interaction associated with the digital component is a click on the digital component by a user of the user device.

7. The method of claim 1, wherein the interaction associated with the digital component comprises providing, by the user device and to the third party device, a request for the digital component.

8. The method of claim 7, wherein the digitally signed token attests that the user device generated (i) the request and (ii) the token.

9. The method of claim 7, wherein the digitally signed token attests that the request for the digital component has not been modified.

10. The method of claim 7, wherein the digitally signed token attests that (i) the request was generated by the user device and (ii) the user device is not modified or a device emulator.

11. A system comprising:

a third party device that includes a communications interface that enables communication over one or more communications networks;

a user device that performs operations including:

receiving, at a particular time, an input indicating interaction with a digital component that is (i) provided by a content provider and (ii) presented by a user interface of the user device;

determining, by a trusted program of the user device, that the interaction is valid by:

detecting, by the trusted program, that the user interface of the user device was active and actively presenting the digital component at the particular time;

determining, by the trusted program and in response to detecting that the user interface of the user device was active and actively presenting the digital component at the particular time, a set of attributes of the digital component, including a location within the user interface at which the digital component was actively presented;

comparing, by the trusted program, each attribute of the determined set of attributes with a corresponding attribute in a set of reference attributes of the digital component that are provided by the content provider;

evaluating validity of the interaction, based on the comparison and by the trusted program, wherein the interaction is deemed valid in response to (i) the comparison indicating a match between the determined set of attributes and the set of reference attributes and (ii) the detection that the user interface of the user device was active and actively presenting the digital component at the particular time;

generating, by the trusted program and based on the determination that the interaction is valid based on the validity evaluation, a digitally signed token that attests the validity of the interaction with the digital component; and providing, by the trusted program and to the third party device, the digitally signed token as an indication of the validity of the interaction.

12. The system of claim 11, the operations further comprising:

detecting, by the trusted program, a trigger event at a first time before the particular time indicating a specific user interaction with a display of the user device;

detecting, by the trusted program and after the first time at the particular time, a target event indicating a different user interaction with the display of the user device;

identifying, by the trusted program and based on detecting the trigger event at the first time before the particular time and the target event at the particular time, a digital component slot in which the digital component was presented associated with the trigger event and the target event; and determining, by the trusted program and based on (i) detecting the trigger event at the first time before the particular time and the target event at the particular time and (ii) identifying the digital component slot associated with the trigger event and the target event, (a) a time period between the first time and the particular time and (b) that an unverified user interaction with the digital component has occurred, wherein receiving the input indicating the interaction with the digital component is performed in response to the determination of (a) the time period between the first time and the particular time and (b) that an unverified user interaction with the digital component has occurred, and wherein the unverified user interaction is the interaction indicated by the input.

13. The system of claim 11, wherein the set of determined attributes of the digital component includes an application within which the digital component is presented.

14. The system of claim 11, wherein the set of determined attributes of the digital component includes one of a size, a type, and the content of the digital component.

15. The system of claim 11, wherein the interaction associated with the digital component is an impression of the digital component to a user of the user device.

16. The system of claim 11, wherein the interaction associated with the digital component is a click on the digital component by a user of the user device.

17. The system of claim 11, wherein the interaction associated with the digital component comprises providing, by the user device and to the third party device, a request for the digital component.

18. The system of claim 17, wherein the digitally signed token attests that the user device generated (i) the request and (ii) the token.

19. A non-transitory computer readable medium storing instructions that when executed by one or more computing devices, cause the one or more computing devices to perform operations comprising:

receiving, at a user device and at a particular time, an input indicating interaction with a digital component that is (i) provided by a content provider and (ii) presented by a user interface of the user device;

determining, by a trusted program of the user device, that the interaction is valid by:

detecting, by the trusted program, that the user interface of the user device was active and actively presenting the digital component at the particular time;

determining, by the trusted program and in response to detecting that the user interface of the user device was active and actively presenting the digital component at the particular time, a set of attributes of the digital component, including a location within the user interface at which the digital component was actively presented;

comparing, by the trusted program, each attribute of the determined set of attributes with a corresponding attribute in a set of reference attributes of the digital component that are provided by the content provider;

evaluating validity of the interaction, based on the comparison and by the trusted program, wherein the interaction is deemed valid in response to (i) the comparison indicating a match between the determined set of attributes and the set of reference attributes and (ii) the detection that the user interface of the user device was active and actively presenting the digital component at the particular time;

generating, by the trusted program and based on the determination that the interaction is valid based on the validity evaluation, a digitally signed token that attests the validity of the interaction with the digital component; and providing, by the trusted program and to a third party, the digitally signed token as an indication of the validity of the interaction.

20. The non-transitory computer readable medium of claim 19, the operations further comprising:

detecting, by the trusted program, a trigger event at a first time before the particular time indicating a specific user interaction with a display of the user device;

detecting, by the trusted program and after the first time at the particular time, a target event indicating a different user interaction with the display of the user device;

identifying, by the trusted program and based on detecting the trigger event at the first time before the particular time and the target event at the particular time, a digital component slot in which the digital component was presented associated with the trigger event and the target event; and determining, by the trusted program and based on (i) detecting the trigger event at the first time before the particular time and the target event at the particular time and (ii) identifying the digital component slot associated with the trigger event and the target event, (a) a time period between the first time and the particular time and (b) that an unverified user interaction with the digital component has occurred, wherein receiving the input indicating the interaction with the digital component is performed in response to the determination of (a) the time period between the first time and the particular time and (b) that an unverified user interaction with the digital component has occurred, and wherein the unverified user interaction is the interaction indicated by the input.

* * * * *